(12) United States Patent
Edwards

(10) Patent No.: US 6,367,978 B1
(45) Date of Patent: Apr. 9, 2002

(54) SEIZE RESISTANT BALL BEARING

(76) Inventor: Kevin C. Edwards, 19211 Nashville St., Northridge, CA (US) 91326

( * ) Notice: Subject to any disclaimer, the term of this patent is extended or adjusted under 35 U.S.C. 154(b) by 0 days.

(21) Appl. No.: 09/615,614

(22) Filed: Jul. 14, 2000

Related U.S. Application Data

(60) Provisional application No. 60/186,508, filed on Mar. 2, 2000.

(51) Int. Cl.[7] .............................................. F16C 19/02
(52) U.S. Cl. ....................................... 384/490; 384/624
(58) Field of Search ................................ 384/445, 450, 384/451, 456, 490, 491, 507, 508, 624, 627

(56) References Cited

U.S. PATENT DOCUMENTS

| | | | | |
|---|---|---|---|---|
| 3,862,783 A | * | 1/1975 | Morris | 384/500 |
| 4,120,542 A | * | 10/1978 | Bhateja et al. | 384/622 |
| 4,390,163 A | * | 6/1983 | Merry | 384/627 |
| 5,234,272 A | * | 8/1993 | Shimada | 384/564 |
| 5,582,483 A | * | 12/1996 | Grunze et al. | 384/572 |

FOREIGN PATENT DOCUMENTS

FR     484410     * 10/1917     ................. 384/508

* cited by examiner

Primary Examiner—Thomas R. Hannon
(74) Attorney, Agent, or Firm—Ted Masters

(57) ABSTRACT

A seize resistant cageless ball bearing (20) includes an inner race (22), an outer race (24) which define a radial space (26) therebetween. A plurality of balls (28) are circumferentially disposed in radial space (26). The number of balls (28) is selected so that cageless ball bearing (20) has at least one ball less than a full complement of balls (28). By removing at least one ball (28) a large maximum circumferential gap (34) is formed. In a preferred embodiment, maximum circumferential gap (34) subtends and angle A of between about 50° and 60°.

2 Claims, 3 Drawing Sheets

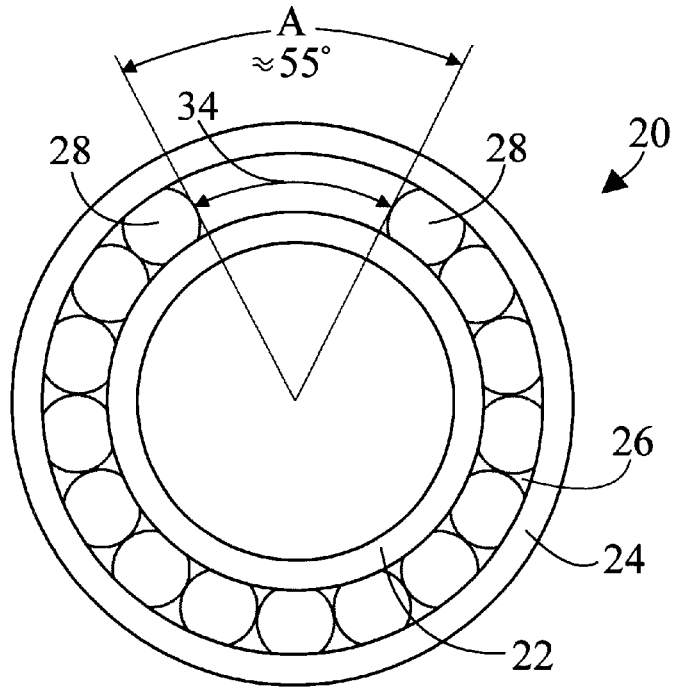
Fig_3
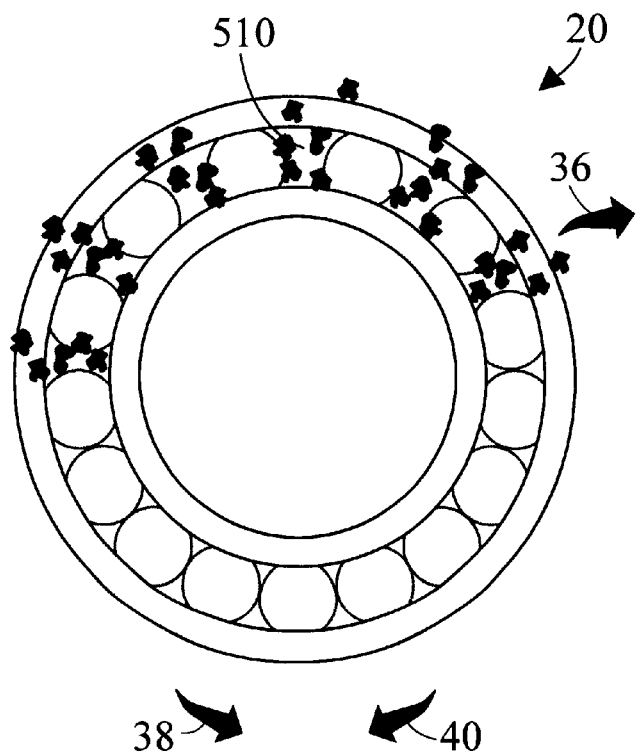
Fig_4

SEIZE RESISTANT BALL BEARING

CROSS REFERENCE TO RELATED APPLICATION

This application claims the filing benefit under 35 U.S.C. §119 (e) of U.S. Provisional Application No. 60/186,508, filed Mar. 2, 2000, which is included herein by reference.

TECHNICAL FIELD

The present invention pertains generally to ball bearings, and in particular to an improved cageless ball bearing which is both resistant to foreign particle-induced seizing, and is self cleaning.

BACKGROUND ART

Rolling-contact bearings are composed of a rolling element interposed between an inner and outer race. In a cageless ball bearing a number of balls rotate freely between inner and outer circular races, thereby permitting the races to independently rotate with respect to each other. The races are grooved to captively accept the balls. The balls are disposed between the races so that the space between the races is substantially circumferentially filled with balls. In another type of ball bearing, separators, sometimes called cages or retainers, are used to evenly space the balls from each other around the race circumference.

Various ball bearing designs are well known in the art. For example, U.S. Pat. No. 3,425,759 shows a gyromotor bearing in which a plurality of sintered polyamide resin, lubricant-impregnated balls are intercalated between the solid steel balls of the bearing. U.S. Pat. No. 4,500,144 defines a bearing member which includes a series of carbon separators. As the separators wear, the space between the balls increases as is shown in FIG. 13. Notice that the radial angle between balls $14^n$ and 14 is about 80 degrees. U.S. Pat. 5,309,529 discloses a bearing arrangement for a radial bearing in an acceleration-proof gyroscope. U.S. Pat. No. 5,443,317 comprises a rolling bearing having balls of different diameters. The balls have limited movement within a pocket.

A cageless ball bearing is defined as a ball bearing which does not include any form of cage, retainer, or separator to hold the balls apart, but rather a ball bearing in which the balls are free to travel between the inner and outer races in abutting relationship. In a conventional cageless ball bearing, the bearing has a "full complement" of balls. A full complement of balls is defined as the maximum number of balls that will circumferentially fit between the inner and outer races. That is, there is not enough room in which to circumferentially fit another ball. There is however a very small circumferential gap between balls so that the balls are free to move circumferentially around the races, and are also free to rotate within the races. The total circumferential gap between all balls (also defined herein as the "maximum circumferential gap") is less than the diameter of one ball, and typically accounts for only about a ten degree or less open sector. This is desirable because by having the balls tightly packed and therefore evenly distributed around the circumference of the races, the axial forces exerted upon the bearing are always balanced, thereby resulting in smooth vibration-free performance.

However, because the balls of the conventional cageless ball bearing are tightly packed around the circumference of the bearing, the conventional cageless ball bearing is highly susceptible to seizing or binding when foreign particles such as sand, rock, chips, debris, and the like are encountered. Particles can wedge into and completely fill the small circumferential gaps between adjacent balls and prevent the balls from both moving circumferentially around the races, and from rotating within the races. When this happens the bearing seizes, usually rendering the parent machine inoperable.

It is toward the solution of this seizing problem to which the teachings of the present invention are directed.

DISCLOSURE OF INVENTION

The present invention is directed to an improved ball bearing of the cageless variety which avoids the previously mentioned seizure problems of conventional cageless ball bearings. The present invention purposefully abandons the traditional concept of "balancing" the bearing with a full complement of balls, and in so doing achieves the "unexpected result" of dramatically improving performance in a hostile foreign particle environment. In the present invention at least one ball is intentionally removed from a full complement of balls, so that when the remaining balls are placed in abutting relationship, a large maximum circumferential gap exists. By having at least one ball less than a full complement of balls, the resulting gap comprises a circumferential space that is too large for foreign particles to fill and thereby seize the bearing.

The present invention not only mitigates against the effect of foreign particles, but is also self cleaning by effectively purging the foreign particles from the bearing. The present invention has been found extremely useful in swimming pool cleaning devices, where in certain instances the ball bearings can be exposed to large amounts of sand and other debris which often results in bearing seizure. By using the design of the present however, the bearings were found not to seize when exposed to substantial amounts of sand and debris. It may be appreciated that while the swimming pool application is useful, the principles of the present invention could also be practiced in any environment where foreign particles and/or debris are existent and free to enter the bearing, such as in a windy desert setting.

In accordance with a preferred embodiment of the invention, a cageless ball bearing has at least one ball less than a full complement of balls. That is, the number of balls is at least one less than a maximum number of balls that will circumferentially fit in the space between the inner and outer races.

In accordance with an important aspect of the invention, a cageless ball bearing includes a maximum circumferential gap which subtends an angle of between about 15° and about 90°.

In accordance with an important feature of the invention, the angle is between about 50° and about 60°.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 3 is a top plan view of ball bearing in accordance with the present invention;

FIG. 4 is a top plan view of the ball bearing of the present invention being exposed to foreign particles;

MODES FOR CARRYING OUT THE INVENTION

Figure 1:
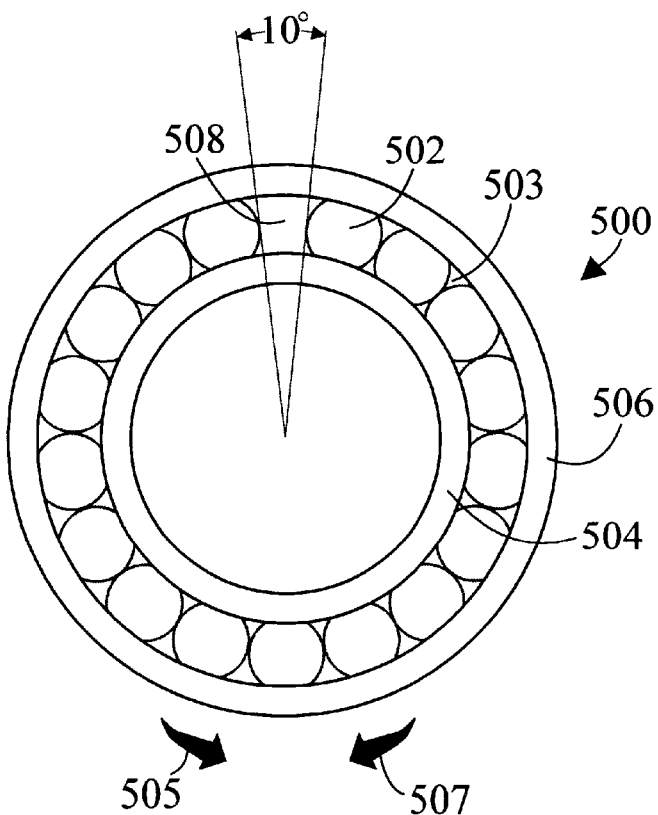
FIG. 1 is a top plan view of a prior art ball bearing having a "full complement" of balls.

Referring initially to FIG. 1, there is illustrated a top plan view of a prior art cageless ball bearing having a "full complement" of balls, generally designated as 500. A plurality of balls 502 are captively disposed in radial space 503 between inner 504 and outer 506 races. When placed in the shown abutting relationship, the number of balls 502 (17 in the shown example) almost circumferentially fills the space between races 504 and 506. This is defined as a full complement of balls since another ball 502 would not fit between the races. A small clearance gap 508 (maximum circumferential gap) subtends an angle of about 10° or less. Outer race 506 is free to rotate in either direction 505 or 507 with respect to inner race 504.

Figure 2:
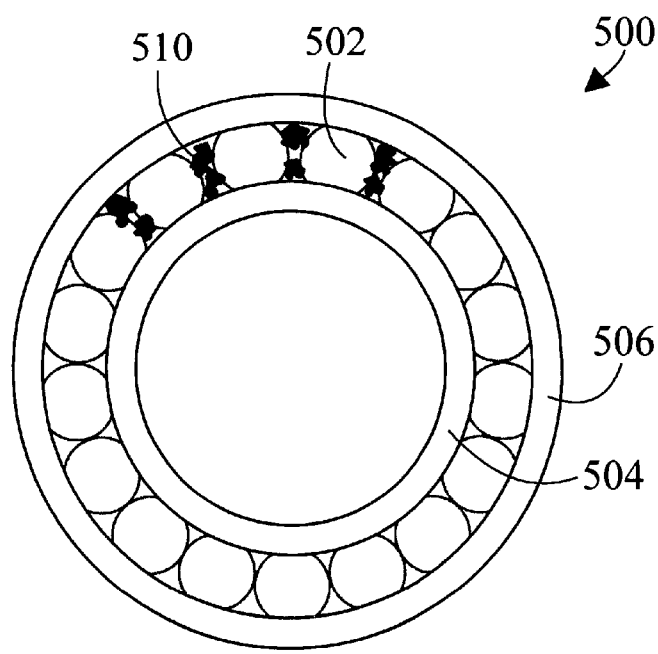
FIG. 2 is a top plan view of the prior art full complement ball bearing shown seizing when exposed to foreign particles.

Referring now to FIG. 2, there is illustrated a top plan view of the full complement ball bearing 500 shown seizing when exposed to foreign particles 510. Since gap 508 is relatively small, there is little room for balls 502 to move circumferentially before they abut an adjacent ball. Therefore, a small amount of foreign particles 510 can become wedged in the space between balls 502 and seize or bind ball bearing 500. When seized, outer race 506 cannot freely rotate with respect of inner race 504.

Now referring to FIG. 3, there is illustrated a seize resistant cageless ball bearing in accordance with the present invention, generally designated as 20. Bearing 20 includes an inner race 22, and outer race 24, and a radial space 26 disposed between the inner race 22 and the outer race 24. A plurality of balls (15 in the shown example) 28 are circumferentially and captively disposed in the radial space 26, so that each ball 28 is free to circumferentially abut two adjacent balls 28 (the balls on either side). In FIG. 3, balls 28 have been placed in abutting relationship wherein the balls 28 form a contiguous arc, so that a maximum circumferential gap 34 exists between the edges of the two end balls 28. In the present invention, maximum circumferential gap 34 subtends an angle A of between about 15° and about 90°. In a preferred embodiment, angle A is between about 50° and about 60° (55° as shown in FIG. 3). By leaving a maximum circumferential gap 34 which is substantially larger than that of the prior art ball bearing 500, balls 28 have much greater freedom to move circumferentially until they abut an adjacent ball 28, and thereby avoid the build up of foreign particles. It is noted that in the shown embodiment the number of balls 28 is two less than a maximum number of balls 28 (full complement of balls 28) that will circumferentially fit in space 26. The number of balls 28 that must be removed from the full complement to achieve the desired gap 34 and angle A will vary depending upon the design and dimensions of the ball bearing 20 and balls 28, however the plurality of balls 28 must be at least one less than a maximum number (full complement) of balls 28 that will circumferentially fit in space 26.

Now referring to FIG. 4, there is illustrated a top plan view of ball bearing 20 being exposed to foreign particles 510. Because balls (28) have been removed, maximum circumferential gap 34 and angle A are large, seizing is almost impossible since the large body of particles 510 necessary to cause seizing cannot fill the larger gaps between balls in a dynamic rotating environment. To the contrary, the particles 510 tend to be purged from bearing 20 as is indicated by the outward arrow 36. Bearing 20 therefore exhibits a novel and very useful self cleaning feature. Even in a hostile environment of foreign particles 510, outer race 24 will freely rotate in either directions 38 or 40 with respect to inner race 22.

Figure 5:
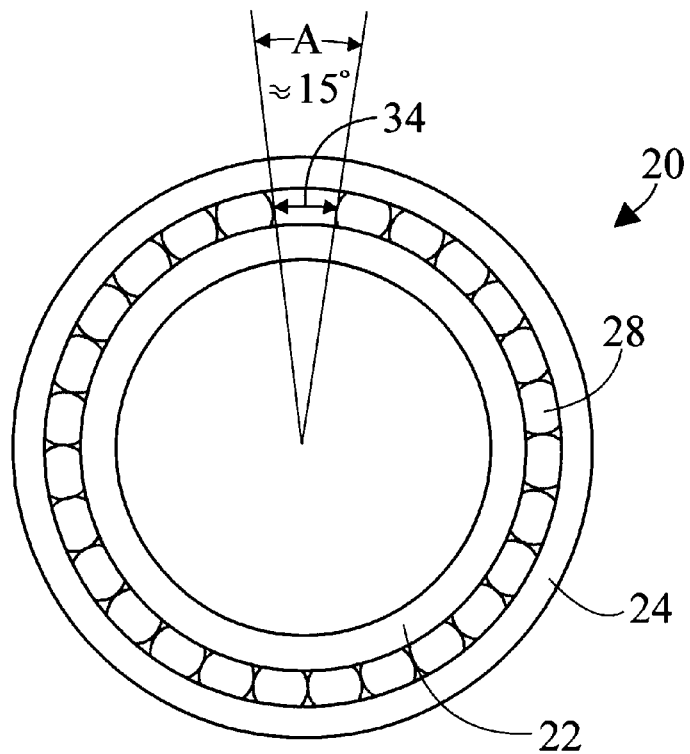
FIG. 5 is a top plan view of a second ball bearing in accordance with the present invention, wherein the angle subtended by the maximum circumferential gap is about 15°; and, FIG. 6 is a top plan view of a third ball bearing in accordance with the present invention, wherein the angle subtended by the maximum circumferential gap is about 90°.

FIG. 5 is a top plan view of a second ball bearing 20 in accordance with the present invention, wherein angle A subtended by maximum circumferential gap 34 is about 15°. In this embodiment, only one ball 28 has been removed from a full complement. A 15° angle is about the smallest angle that can be utilized to practice the principles of the present invention, lest ball bearing 20 fall prey to the same seizure problems as a conventional bearing 500.

Figure 6:
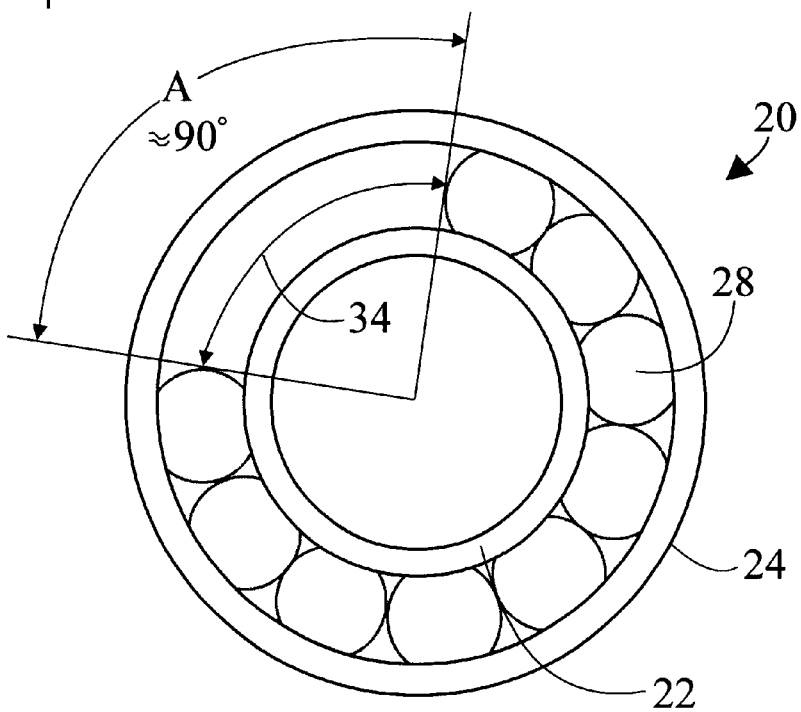

FIG. 6 is a top plan view of a third ball bearing 20 in accordance with the present invention, wherein angle A subtended by maximum circumferential gap 34 is about 90°. In this embodiment, three balls 28 have been removed from a full complement.

Looking at the teachings of the present invention in a slightly different way, a method for preventing seizure in a cageless ball bearing comprises, (1) providing a conventional cageless ball bearing which can accommodate a full complement of balls, and (2) installing at least one ball less than the full complement of balls in the cageless ball bearing.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A cageless ball bearing, comprising:

a inner race;

an outer race;

a radial space disposed between said inner race and said outer race;

a plurality of balls circumferentially disposed in said radial space;

said plurality of balls being at least one less than a maximum number of said balls that will circumferentially fit in said space;

a maximum circumferential gap subtending an angle of between about 15° and about 90°; and, said angle being between about 50° and about 60°.

2. A cageless ball bearing, comprising:

said cageless ball bearing having at least one ball less than a fill complement of said balls;

a maximum circumferential gap subtending an angle of between about 15° and about 90°; and, said angle being between about 50° and about 60°.

\* \* \* \* \*